April 14, 1942. J. C. HARKNESS 2,279,458
COMBINED HEEL BRAKE AND ACCELERATOR PEDAL
Filed Aug. 13, 1941
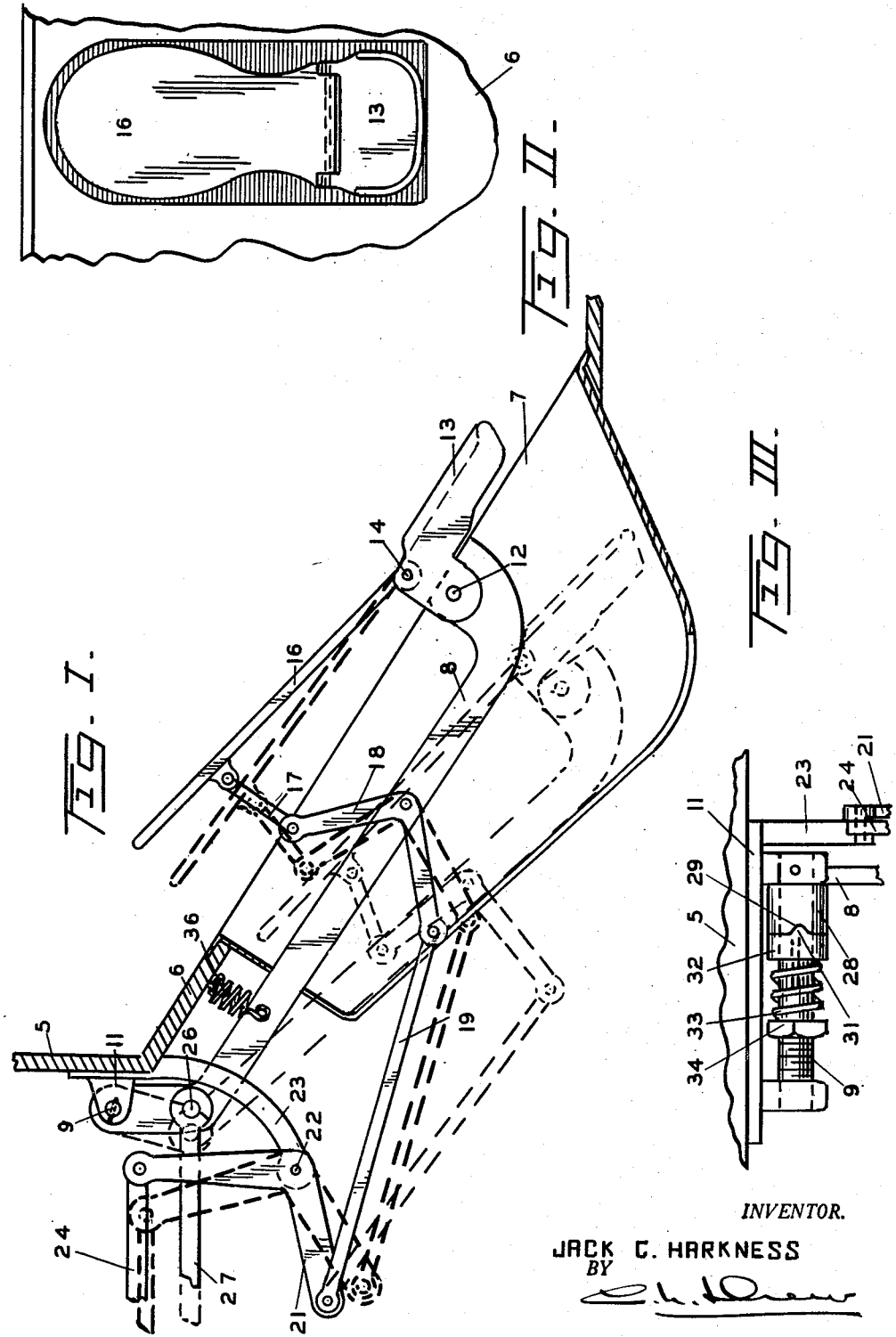
INVENTOR.
JACK C. HARKNESS
BY Patented Apr. 14, 1942

2,279,458

UNITED STATES PATENT OFFICE 2,279,458

COMBINED HEEL BRAKE AND ACCELERATOR PEDAL

Jack C. Harkness, Alameda, Calif.

Application August 13, 1941, Serial No. 406,621

2 Claims. (Cl. 192—3)

This invention relates to improvements in mechanical movements and has particular reference to a combined foot brake pedal and accelerator pedal movement.

The principal object of this invention is to combine with a brake pedal and motor vehicle an accelerator pedal in such a manner that they are both operated by the same foot, thereby permitting acceleration of the engine previous to getting away on a hill, which is often a difficult procedure, where it is necessary to move the foot from the brake pedal to the accelerator pedal.

A further object of the invention is to produce a device of this character which is economical to manufacture, simple to install, and one which may be placed upon the average car without any material alterations.

A further object of the invention is to provide means whereby the accelerator pedal portion of the device falls away from the foot as the brake pedal is depressed, thereby eliminating accidental acceleration when only a brake effect is desired.

Other objects and advantages will be apparent during the course of the following description.

In the accompanying drawing forming a part of this specification and in which like numerals are employed to designate like parts throughout the same, Fig. I is a side elevational view of my device as the same would appear installed on a vehicle and showing in heavy and light dotted positions the normal accelerator pedal movement and the brake pedal movement, respectively;

Fig. II is a top plan view of the combined brake and accelerator pedal; and

Fig. III is a fragmentary detailed view of the brake pedal hinge arrangement.

In the average motor vehicle it is common to employ a clutch pedal, a brake pedal and an accelerator pedal. In driving a car it is often necessary to remove the foot from the accelerator pedal and place it on the brake pedal or vice versa. It is this transfer of the foot from one pedal to the other that I am seeking to eliminate by combining the two pedals into one, the result being that when these pedals are combined, it is possible for the driver to accelerate the engine while his foot is still upon the brake pedal, thus permitting the driver of a car to proceed up a heavy grade without the use of a hand brake, as is now customary. By merely accelerating the engine and slowly releasing the brake and the clutch, the car will proceed in a normal manner without undue sudden jerking as occurs when the brake pedal is quickly released and the accelerator pedal quickly applied.

In the accompanying drawing wherein for the purpose of illustration is shown a preferred embodiment of my invention, the numerals 5 and 6 designate the dash board and floor board, respectively, of an ordinary motor vehicle, into the floor board of which is inserted a housing 7 which forms a well for the combined brake and accelerator pedal as a whole. The brake lever 8 is pivoted on a fixed shaft 9 to the support 11 mounted upon the dash board 5. This lever has pivoted thereto, as at 12, the heel plate 13, commonly referred to as the brake pedal. Pivoted to this heel plate 13, as at 14, is an accelerator pedal 16, which is connected by a link 17 to an offset bell-crank 18 which is in turn supported on lever 8. The opposite end of this bell-crank is connected by a link 19 to one arm of a bell-crank 21, which is pivotally supported at 22 to a bracket 23. It will here be noted that the pivotal point 22 is downwardly and forwardly offset from the pivotal shaft 9, the purpose of which will be later seen. The opposite end of the bell-crank 21 is connected by a push rod 24 to the customary carburetor valve. Pivoted as at 26 to the lever 8 is a push rod 27, which is connected to the brake system.

Referring now to Fig. III, it will be noted that the lever 8 has a hub portion 28 rotatably mounted on the shaft 9. A depression 29 is formed in the hub portion and is adapted to receive the nose 31 of a sliding collar 32 longitudinally keyed on the shaft 9 and held by a spring 33 into engagement with the hub portion 28. An adjusting nut 34, threadedly mounted on the shaft, permits the tension of the spring 33 to be adjusted. A return spring 36 is connected to the lever 8 and to the floor board 6, the purpose of which is obvious.

The result of this construction is that when the parts are in the position shown in solid lines in Fig. I, the operator of the vehicle rests his heel on the heel plate 13 and the ball of the foot on the accelerator pedal 16. By now depressing the accelerator pedal the parts will move as shown in heavy dotted lines, thus speeding up the engine in the manner customary when the accelerator pedal is depressed. By now exerting more pressure upon the heel so as to overcome the tension of the spring 33, the nose 31 will move out of the depression 29 on the collar 32 and will ride on the side of the collar, the return spring 36 now taking up the brake lever load.

Assuming that the heel plate is pushed to the light dotted line position, it will be noted that the heel plate may pivot on the pivot 12 so as to make a more comfortable position for the foot as the pedal travels downwardly. It will also be noted that due to the offset of the pivot 22 from the center of the shaft 9, the acceleraor pedal will drop away from the ball of the foot. In other words, in the full line position shown, there is a considerable angle between the heel plate and the accelerator pedal; but in the depressed position, although the heel plate is tipped away from the lever, the accelerator pedal is practically parallel with the top plane of the heel plate and yet there is sufficient room to further depress the accelerator pedal to speed the engine in a getaway as the brake is released. It is by offsetting these two pedal points 22 and the shaft 9 that I accomplish this dropping away of the accelerator pedal during the depression of the heel plate and its brake lever.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a support, a brake lever pivoted thereto, a heel plate pivoted to the free end of said brake lever, an accelerator pedal pivoted to said heel plate, a bracket extending below and to one side of said support and pivoted linkage carried by said bracket and said brake lever, said linkage being connected to said accelerator pedal and to a push rod, the pivotal connections of said bracket and said brake lever being offset with respect to each other, and a brake push rod connected to said lever.

2. In a device of the character described, a support having a shaft secured therein and held against rotation, a brake lever pivotally mounted on said shaft, means slidably carried on said shaft for normally maintaining said brake lever in a fixed position, a bracket extending downwardly and forwardly from said support, a bell-crank lever mounted on said bracket, one arm of said bell-crank lever being connected to a push rod, the other arm of said bell-crank lever being connected to a second bell-crank lever pivotally mounted on said brake lever, a heel plate pivoted to the free end of said brake lever, and an accelerator pedal pivoted to said pivoted heel plate and being connected to the free arm of said second-mentioned bell-crank lever.

JACK C. HARKNESS.